United States Patent [19]

Bandel et al.

[11] Patent Number: 5,456,881
[45] Date of Patent: Oct. 10, 1995

[54] PROCESS FOR THERMALLY SEPARATING ORGANIC AND/OR INORGANIC SUBSTANCES FROM CONTAMINATED MATERIAL

[75] Inventors: Gebhard Bandel, Frankfurt am Main; Stephan Becker, Biebertal-Fellingshausen; Dirk Hankel, Lämmerspiel-Mülheim; Gurudas Samant, Fronhausen; Erhard Weilandt, Friedrichsdorf; Johann Renner, Nittenau, all of Germany

[73] Assignee: Metallgesellschaft Aktiengesellschaft, Frankfurt am Main, Germany

[21] Appl. No.: 196,851

[22] Filed: Feb. 10, 1994

[30] Foreign Application Priority Data

Feb. 10, 1993 [DE] Germany ............ 43 03 722.4

[51] Int. Cl.⁶ .................................. A61L 2/06
[52] U.S. Cl. ............... 422/27; 110/245; 110/246; 422/32; 422/38; 422/139; 422/177; 422/184.1; 422/209; 422/309
[58] Field of Search ............ 422/27, 38, 30–32, 422/139, 144, 186.3, 209, 210, 309, 900, 168, 184, 177; 34/384, 469, 472, 479, 480, 74, 77, 78, 80, 131, 132; 110/245, 246; 588/226, 227, 230, 251

[56] References Cited

U.S. PATENT DOCUMENTS

| | | | |
|---|---|---|---|
| 2,349,249 | 5/1944 | Desetti et al. | 34/74 |
| 3,538,615 | 11/1970 | Führing et al. | 34/74 |
| 4,947,767 | 8/1990 | Collette | 110/246 X |
| 4,969,775 | 11/1990 | Cappel et al. | 405/128 |
| 4,980,092 | 12/1990 | Pineau et al. | 110/246 X |
| 4,982,512 | 1/1991 | McClenny | 34/472 X |
| 5,094,012 | 3/1992 | Rosenstock et al. | 34/468 |
| 5,196,887 | 3/1993 | Pederson et al. | 110/246 X |
| 5,276,250 | 1/1994 | Hagenmaier et al. | 588/213 |
| 5,282,431 | 2/1994 | Kiss | 110/245 X |

FOREIGN PATENT DOCUMENTS

| | | |
|---|---|---|
| 0252521 | 10/1991 | European Pat. Off. . |
| 0245655 | 11/1992 | European Pat. Off. . |
| 3937952 | 5/1991 | Germany . |

*Primary Examiner*—Robert J. Warden
*Assistant Examiner*—Krisanne M. Thornton
*Attorney, Agent, or Firm*—Herbert Dubno

[57] ABSTRACT

Organic and/or inorganic substances and water are thermally separated from contaminated materials, solid aggregates, the contaminated material is pretreated and is subsequently heated in a directly or indirectly heated furnace, which includes a rotary kiln, a fluidized bed furnace or a floating zone reactor, and during the heating the material is treated with recycled hot gases or recycled hot steam and with oxidizing agents. The exiting processing gases, which contain water vapor, are dedusted, and 80 to 90% by volume of the water vapor-containing processing gases are recycled to the furnace to act as entraining gas. The remaining water vapor-containing processing gases are condensed, the resulting liquid phase is withdrawn, and pollutants are removed from the withdrawn liquid phase by a wet chemical or physical processing.

15 Claims, 7 Drawing Sheets

PROCESS FOR THERMALLY SEPARATING ORGANIC AND/OR INORGANIC SUBSTANCES FROM CONTAMINATED MATERIAL

FIELD OF THE INVENTION

Our present invention relates to a process for thermally separating organic and/or inorganic substances and water from contaminated soils, sands, sludges, solid aggregates, and solid residues, hereinafter referred to as wastes.

BACKGROUND OF THE INVENTION

EP O 245 655 B1 discloses a process for thermally separating volatile and often heterogeneous organic or inorganic substances as well as the water content from contaminated soils, sands, sludges and comparable solid aggregates and residues.

In that process a thermal treatment with hot gases or hot steam is followed by a condensation of the resulting processing gases, which contain water vapor and pollutants. The liquid phase is withdrawn and the pollutants are removed from it by a wet chemical or physical processing. Residual gases may be thermally aftertreated or the residual pollutants may be removed from the residual gases by adsorption.

A disadvantage of that process resides in that the pollutants are transferred by the processing gases into the condensate and must be removed from the condensate by succeeding sewage purification processes.

DE 39 37 952 A1 discloses a process for purifying contaminated soils. The soils are treated with steam and the effluent vapor is condensed. In that process a layer of the soil is applied to a gas-permeable substrate in a pressurizable housing, which is supplied with steam at a temperature from 100° to 190° C. and under a pressure from 1 to 12 bars. That steam is supplied to the pressurizable housing and passed through the layer. The steam leaving the layer is withdrawn from the pressurizable housing and is condensed. The condensate is supplied to a purifier, and the solids are delivered as purified soil.

When the layer has been dewatered or reheated, wet steam which contains oxidizing substances may be passed through the layer. The oxidizing substance may primarily consist of air although oxygen-enriched air and/or $H_2O_2$ may be used. A part of the effluent steam may be recycled to preheat the aqueous suspension of the contaminated soil before the latter is fed. Because the layer of contaminated soil is stationary relative to the substrate, the contaminated material is not moved.

EP 0 252 521 B1 discloses a process for decomposing polyhalogenated cycloalkyl compounds having 4 to 8 carbon atoms and of polyhalogenated aromatic compounds having at least 5 carbon atoms. That process comprises heating in the presence of a catalyst. In that process the volatile constituents are present in a solid substrate, which is contaminated with polyhalogenated compounds, or in a liquid substrate which is contaminated with the polyhalogenated compounds, or in a liquid substrate which is contaminated with the polyhalogenated compounds and the volatile constituents or the liquid substrate or the polyhalogenated compounds themselves may be converted to a gas by heating or combustion and the resulting gases or a gaseous substrate which is contaminated with the polyhalogenated compounds is or are heated in close contact with the catalyst and in the presence of oxygen and water.

The process is carried out in the presence of oxygen and water to ensure that the catalysts will mainly be preserved as an oxide material and that HCl rather than chlorine will be formed as the polyhalogenated compounds are destroyed.

OBJECTS OF THE INVENTION

It is an object of the present invention to provide a process which is ecologically satisfactory and in which energy is conserved and by which organic and/or inorganic volatile substances contained in contaminated soils, sands, sludges and comparable solid aggregates and solid residues are thermally destroyed and are converted to gaseous substances which do not pollute the environment.

Another object is to provide an improved process for thermally separating organic and/or inorganic substances from contaminated material to yield a decontaminated solid whereby drawbacks of earlier processes are avoided.

Still another object is to provide an improved process for decontaminating solids which is more economical and environmentally sound than earlier processes.

SUMMARY OF THE INVENTION

These objects and others which will become apparent hereinafter are accomplished, in accordance with the invention, in that (a) the contaminated material is pretreated and is subsequently heated in a directly or indirectly heated furnace, which consists of a rotary kiln, a fluidized bed furnace or a floating zone reactor, and during the heating the material is treated with recycled hot gases or recycled hot steam and with oxidizing agents, (b) the exiting processing gases, which contain water vapor, are dedusted, and 80 to 90% by volume of the water vapor-containing processing gases are recycled to the furnace to act as entraining gas, and (c) the remaining water vapor-containing processing gases are condensed, the resulting liquid phase is withdrawn, and pollutants are removed from the withdrawn liquid phase by a wet chemical or physical processing.

Compared to the known processes the process in accordance with the present invention affords the advantage that the contaminated material is moved, preferably continuously, in a rotary kiln, fluidized bed furnace or floating zone reactor so that much higher throughputs are achieved. A further advantage resides in that 80 to 90% by volume of the water vapor-containing hot processing gases are recycled to the furnace so that the work of condensation is greatly decreased. Besides, the demand for fresh water is decreased because the water content of the contaminated material is utilized.

The heating may be effected in a furnace consisting of a rotary kiln, a fluidized bed furnace or a floating zone reactor. In accordance with the invention a reactor can be used which consists of an elongate rectangular chamber, which contains above the bottom of the chamber a fixed sieve plate, which extends throughout the cross-section of the chamber. The material is discharged by a feeder to fall at one end of the chamber onto the sieve plate and is moved by a scraper chain conveyor on the sieve plate to the other end and is discharged there. The hot gases or the hot steam are or is supplied below the sieve plate. The hot gases or the hot steam and the oxidizing agents flow through the agitated fluidized bed from bottom to top. The contaminated material is heated to a temperature of 120° to 700° C.

In a directly heated furnace the hot gases or the hot steam (entraining gas) must be heated to the temperature required for the reaction before they are fed to the furnace. In an indirectly heated furnace the hot gases or the hot steam (entraining gas) must be kept above the dewpoint temperature, and it may be necessary to heat the entraining gas to a temperature above the dewpoint before it is fed to the furnace.

In dependence on the nature of the contamination, the furnace may be operated in a certain temperature range. For instance, when there is a mixture of polyaromatic hydrocarbons and mineral oils and of organic and inorganic cyanide compounds, the furnace may be operated at temperatures in the range from 150° to 500° C. If the materials are contaminated only with polychlorinated alkanes, e.g., with chloroparaffins, the furnace may be operated at temperatures in the range from 150° to 250° C. If the materials are contaminated with polychlorinated biphenyls, the furnace may be operated at temperatures in the range from 120° to 200° C. For this reason it is possible to control the furnace temperature in a certain range in dependence on the pollutants.

The oxidizing agents are added at a hyperstoichiometric rate relative to the current rate of pollutants.

The water vapor-containing gases leaving the furnace are dedusted in a dedusting plant, which in accordance with the invention consists of a tube filter, bag filter or electrostatic precipitator.

The rate at which the water vapor-containing processing gas is recycled to the furnace is 80 to 90% of the total rate of water vapor-containing processing gas which leaves the furnace at its outlet after the oxidation. The rate at which steam is supplied is determined in dependence on the previously measured water content of the contaminated material. The presence of water vapor ensures that the advantages afforded by a steam distillation will be utilized within the scope of the invention.

The remaining water vapor-containing processing gas is condensed. That remaining water vapor-containing processing gas amounts to between 10 and 20% of the total processing gas leaving the furnace.

Because a major part of the water vapor-containing treating gas is recycled, the amount of condensate is greatly decreased and corresponds approximately to the moisture content of the contaminated material which is charged. The recycling of the processing gas results in a considerable saving of energy because it is sufficient to cool 10 to 20% of the processing gas. The gas leaving the condensing stage is saturated with water vapor and is subsequently discharged through a stack or chimney.

The condensate is purified in a manner known per se by wet chemical or physical processing, and the purified waste water is discharged into a receiving body of water. A partial stream of water may be branched off before the receiving water body of water and recycled as a coolant to the condensing stage. Fresh steam is supplied to start the process until a steady-state circulation has been established and is subsequently supplied to compensate the losses.

In the process according to the invention, only a very small part of the pollutants enters the condensate. Besides, the recycle gas has only a very low pollutant content.

According to a feature of the invention the remaining pollutants are removed by adsorption from the gases leaving the condensing stage.

According to a preferred feature of the invention oxygen-enriched air, $O_2$, $H_2O_2$ and/or ozone are used as oxidizing agents.

According to a preferred feature of the invention the water vapor-containing exiting processing gases are dedusted and are subsequently catalytically oxidized and a partial stream of the gases leaving the condensing stage (c) is recycled to the catalytic oxidizing state.

The water vapor-containing processing gases which have been dedusted are subjected to a catalytic oxidation so that those pollutants which have not been oxidized by the oxidation in the furnace are oxidized by the subsequent catalytic oxidation. This is preferably effected in that the water vapor-containing processing gases are passed through a fixed bed catalyst or through a honeycomb catalyst and oxygen-enriched air, oxygen, ozone or $H_2O_2$ is added until an oxygen partial pressure of 10% of the total pressure has been achieved. The progress of the catalytic oxidation is monitored by a continuous measurement of gas chromatography. When the catalytic oxidation has been effected a major part of the water vapor-containing processing gases is recycled at a temperature in excess of 400° C. to the furnace and the remainder is supplied to the condensing stage.

Those gases which are not condensed are recycled in a further cycle to the catalytic oxidizing stage. The rate of the gas which is recycled to the catalytic oxidizing stage is about 90% of the rate of the gases which are not condensed and the recycled gases consist mainly of oxygen. The remaining gas which is not recycled to the catalytic oxidizing stage may be passed through an activated carbon filter to remove any residual pollutants and may subsequently be discharged through a chimney.

According to a desirable feature of the invention the catalytic oxidation is effected by catalytically active substances comprising oxides and/or sulfates of one or more transition metals selected from vanadium, chromium, manganese, iron, cobalt, nickel, zinc, molybdenum or tungsten. To provide fixed-bed catalysts or honeycomb catalysts, the catalytically active substances are applied to solid carriers, which consist of aluminum silicates or alumino-silicates or $TiO_2$.

According to a desirable feature of the invention the water vapor-containing exiting processing gases which have been dedusted are irradiated with UV light.

The treatment with UV light is effected in a reactor, which is provided on its inside surfaces with UV sources. Irradiation is effected at a wavelength of <300 nm. The irradiation with UV after the direct oxidation in the furnace will produce particularly good results in the treatment of materials which are contaminated with polychlorinated alkanes.

In accordance with the invention the catalytic oxidizing stage and the succeeding UV irradiation stage or the UV irradiation stage and the succeeding catalytic oxidizing stage may succeed the oxidation in the furnace.

According to a desirable feature of the invention the oxidizing agent is directly supplied to the furnace. Whereas the oxidizing gas may be supplied to the furnace together with the entraining gas, it will then be necessary to supply the oxidizing gas at a much higher rate because longer mixing paths will adversely affect the effectiveness of the oxidizing agents. For this reason it has been found that it is desirable to supply the oxidizing agents directly to the furnace In an orthodox (non-circulating) fluidized bed the oxidizing agents are supplied into the gas phase directly over the dense phase. In a rotary kiln the oxidizing agents are axially charged directly over the bed of solids. During a processing in a rotary kiln, the hot gases or the hot steam are suitably blown into the charge bed through an annular series of spaced apart nozzle blocks mounted in the furnace and gas is not supplied thorough the nozzle blocks unless they are under the charge bed.

According to another feature of the invention the contaminated material is dried before it is charged into the furnace.

According to a further feature of the invention the contaminated material is disintegrated and/or classified before it is charged into the furnace.

Advantageously the contaminated material is subjected to a pre-separation and to a gravimetric separation before it is charged into the furnace. By a preceding pre-separation and gravimetric separation of the coarse fraction >1 mm, e.g., on a jigging machine, it is possible to decrease the amounts which are charged into the furnace.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
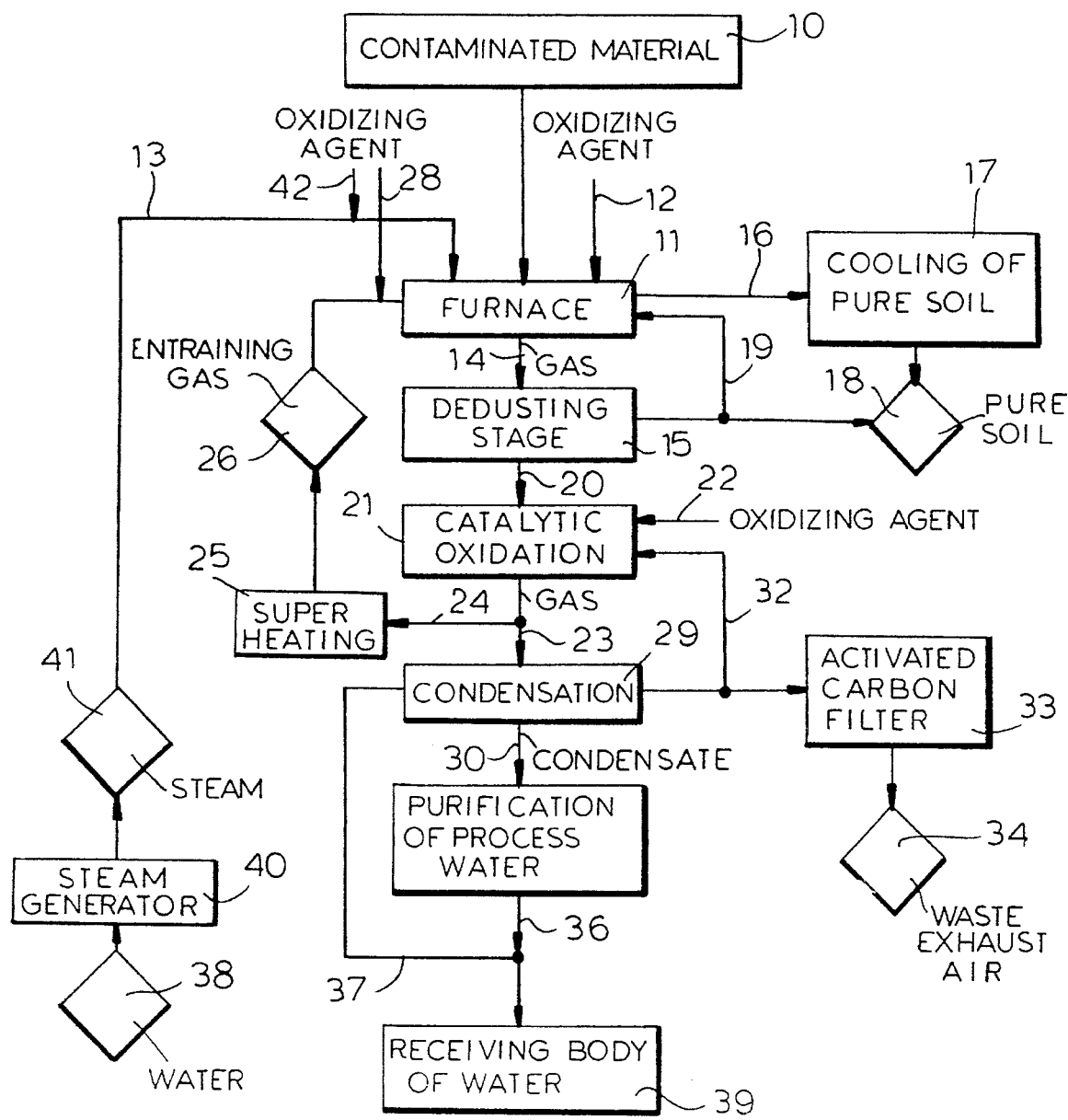
FIGS. 1 and 2 are flow diagrams illustrating the process of the invention and which begin with the treatment of the contaminated material in the furnace.

FIG. 1 illustrates a catalytic oxidation of the gas which has left the furnace.

In the flow diagram of FIG. 1, the contaminated material 10 is fed to the furnace 11 together with the oxidizing agent 12 or 13 and the gas phase, i.e. the exiting gas containing water vapor is fed at 14 to the dedusting stage 15. The solid residue is withdrawn from the furnace at 16 and cooled at 17 as a decontaminated soil 18.

The solid phase recovered from the dedusting stage is either pure soil which can be combined with the cooled soil from the cooling stage 17 or recycled at 19 to the furnace, e.g. in the case of a fluidized bed.

The dedusted gas at 20 is fed to the catalytic oxidation stage 21 supplied with an oxidizing agent at 22 and containing one of the catalysts previously described. A portion of the effluent gas at 23 may be fed at 24 to a superheating stage 25 to become an entraining gas 26 recycled to the furnace 11 together with any oxidizing agent added at 28 thereto. That portion of the effluent gas at 23 is 80 to 90% by volume.

The balance of the dedusted gas at 23 is fed to the condensation stage 29 from which a condensate is recovered as a liquid phase 30 and is separated from the gas phase at 31, part of which may be recycled at 32 to the catalytic oxidation stage while the balance is passed through an activated carbon filter at 33 and discharged at 34 as waste exhaust gas. The condensate, consisting largely of water, is subjected to water purification at 35 and the result at 36 is a process water which can be recycled at 37 to the condensation stage, fed as a source of water 38 for the production of steam, or discharged as a clean effluent at 39 into, for example, a receiving body of water.

The steam is fed to the furnace as or with the oxidizing agent at 13, the steam can be generated at 40 and supplied at 41 to the line 13, the oxidizing agent being added at 42.

Figure 2:
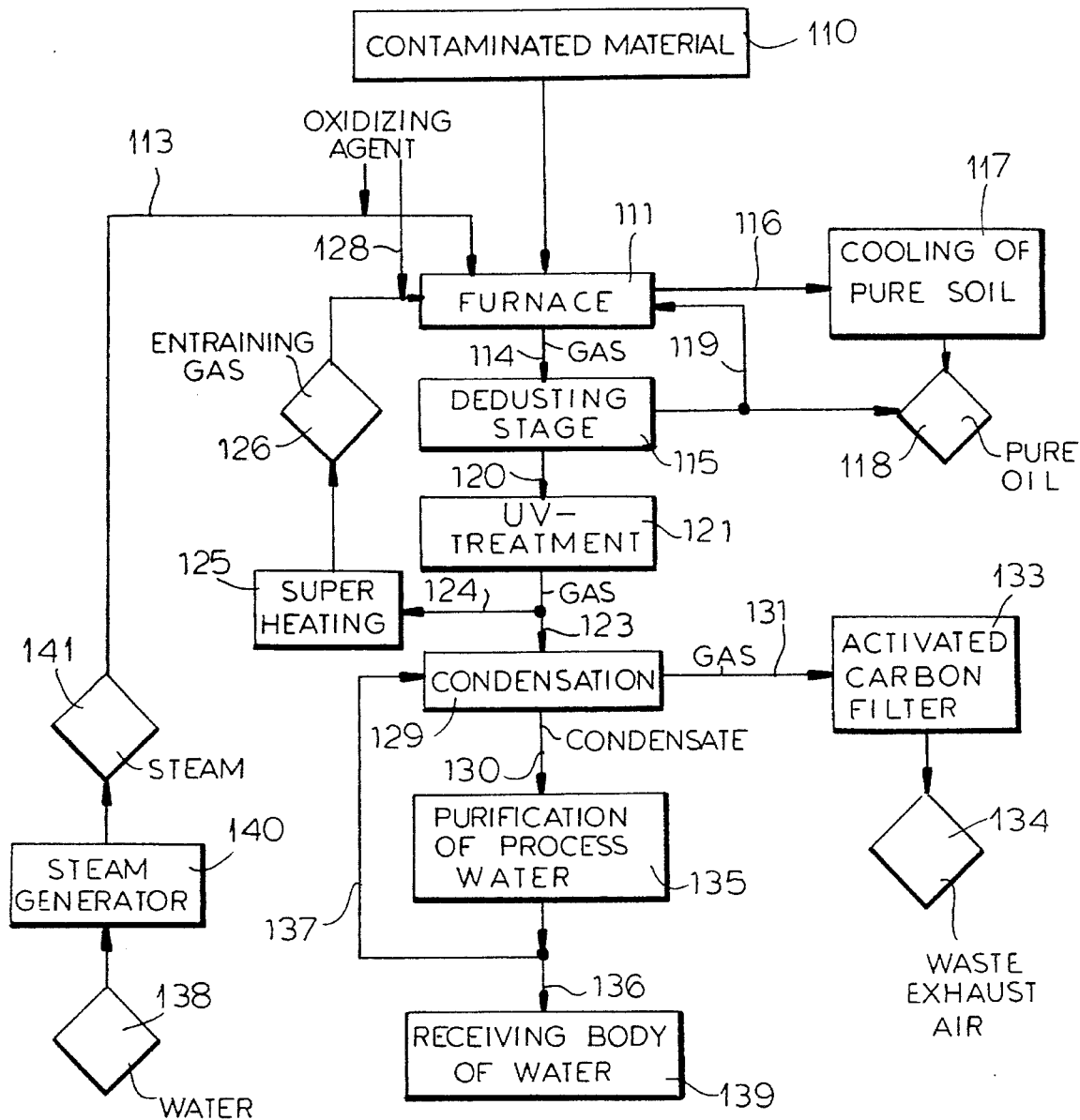

FIG. 2 illustrates an UV treatment of the gas which has left the furnace.

In this embodiment the contaminated material 110 is fed to the furnace 111 to which the oxidizing agent can be supplied at 113 and 128. Here the solid residue is fed at 116 to the cooling stage 117, the pure soil being recovered at 118.

The gas effluent from the furnace at 114 is fed to the dedusting stage 115 and part of the dust is collected as pure soil at 118 while the balance is recycled at 119 to the furnace 111. In this embodiment, instead of a catalytic oxidation treatment for the dedusted gas, the dedusted gas at 120 is subjected to a UV treatment at 121 before a portion of that gas is split off at 124 to the superheater 125 as the entraining gas 126.

The balance of the gas at 123 is fed to the condensation stage 129 from which the gas phase is fed at 131 to the activated carbon filter 133 as the waste exhaust air 134. The condensate at 130 is subjected to purification at 135 with recycling at 137 of some of the process water to the condensation stage while the balance is fed at 136 to the receiving body of water 139. The steam 141 fed to the furnace is produced in the steam generator 140 from the source water 138.

Figure 3:
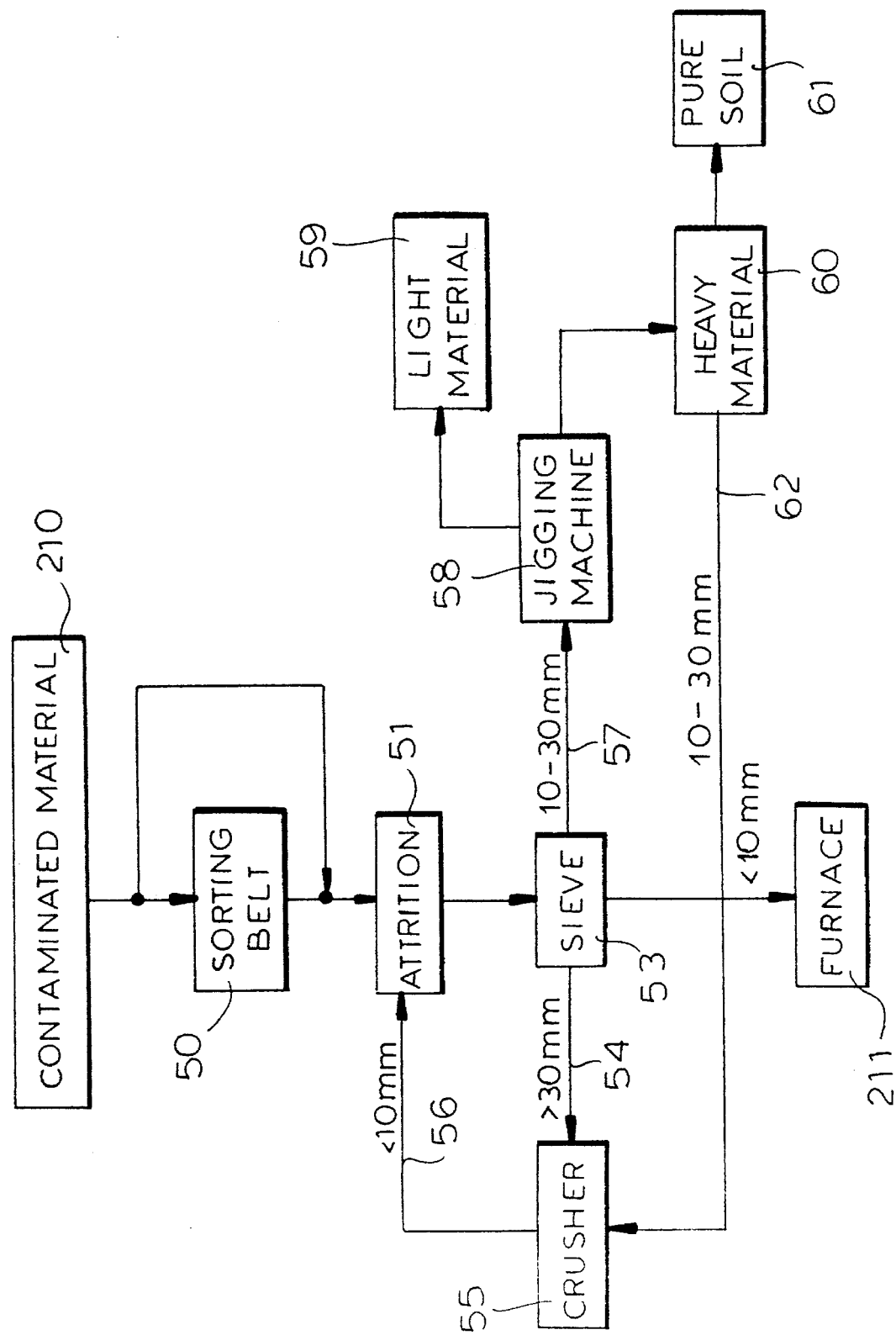
FIGS. 3 to 5 are flow diagrams of the process according to the invention illustrating the pretreatment of the contaminated material before it is charged into the furnace.

In FIG. 3, the contaminated material 210 can be fed, prior to entry to the furnace 211 where it can be processed. By either of the embodiments described with reference to FIGS. 1 and 2, onto a sorting belt 50 upstream of an attrition or comminuting stage 51 from which the comminuted product 52 is subjected to classification on a sieve 53. The large fraction can be fed at 54 to a crusher 55 from which it is returned at 56 to the comminuter 51. Another fraction can be fed at 57 to the jigging machine 58 which separates it into the light material fraction 59 and the heavy material 60 which can be retained as pure soil 61 or fed at 62 to the crusher 55.

Figure 4:
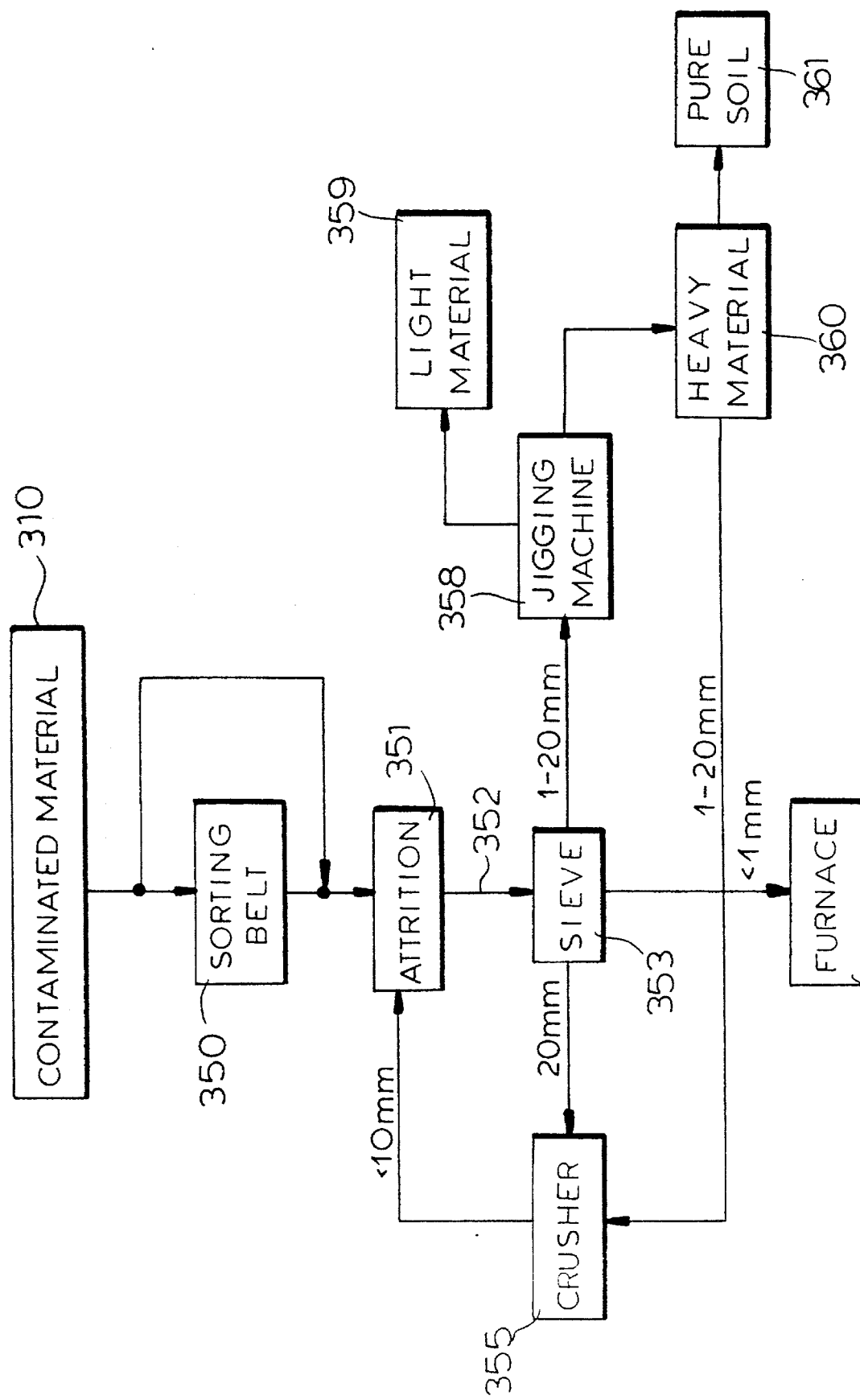

An alternative preprocessing system has been shown in FIG. 4 in which the contaminated material 310 can be fed on a sorting belt 350 to the attrition stage 351 from which the comminuted product is delivered to the sieve 353 at 352. In this embodiment, as shown by the parameters given in the Figure, the furnace receives a finer grained material. The sieve is associated with the crusher 355 and the jigging machine 358 which, in turn, recovers light material at 359 and heavy material at 360 which can include pure soil at 361.

Figure 5:
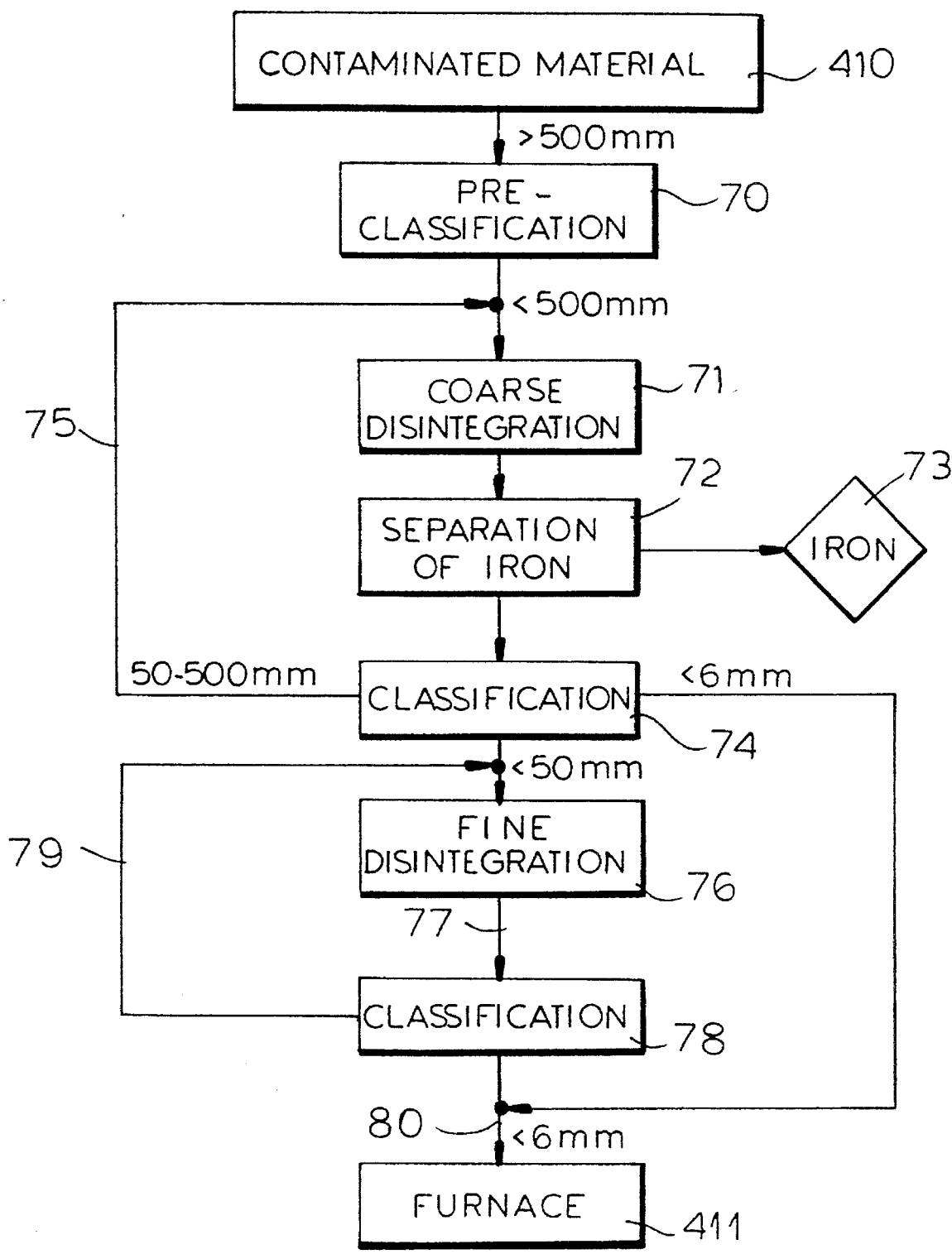
Figure 6:
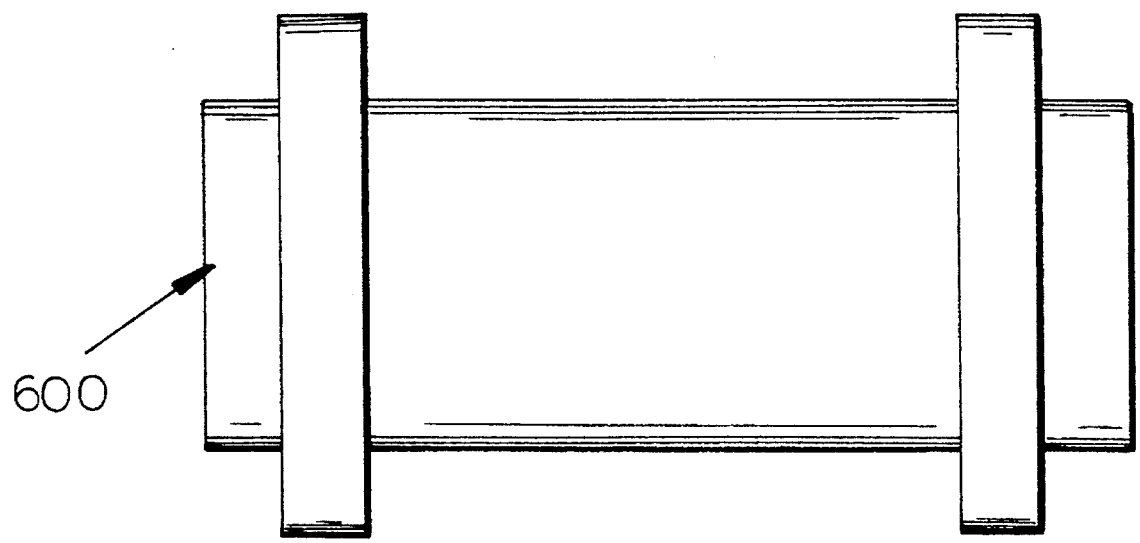
Figure 7:
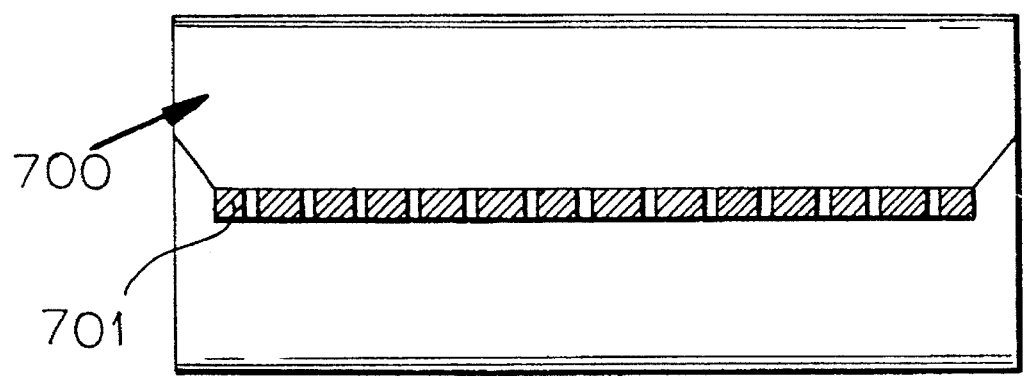
Figure 8:
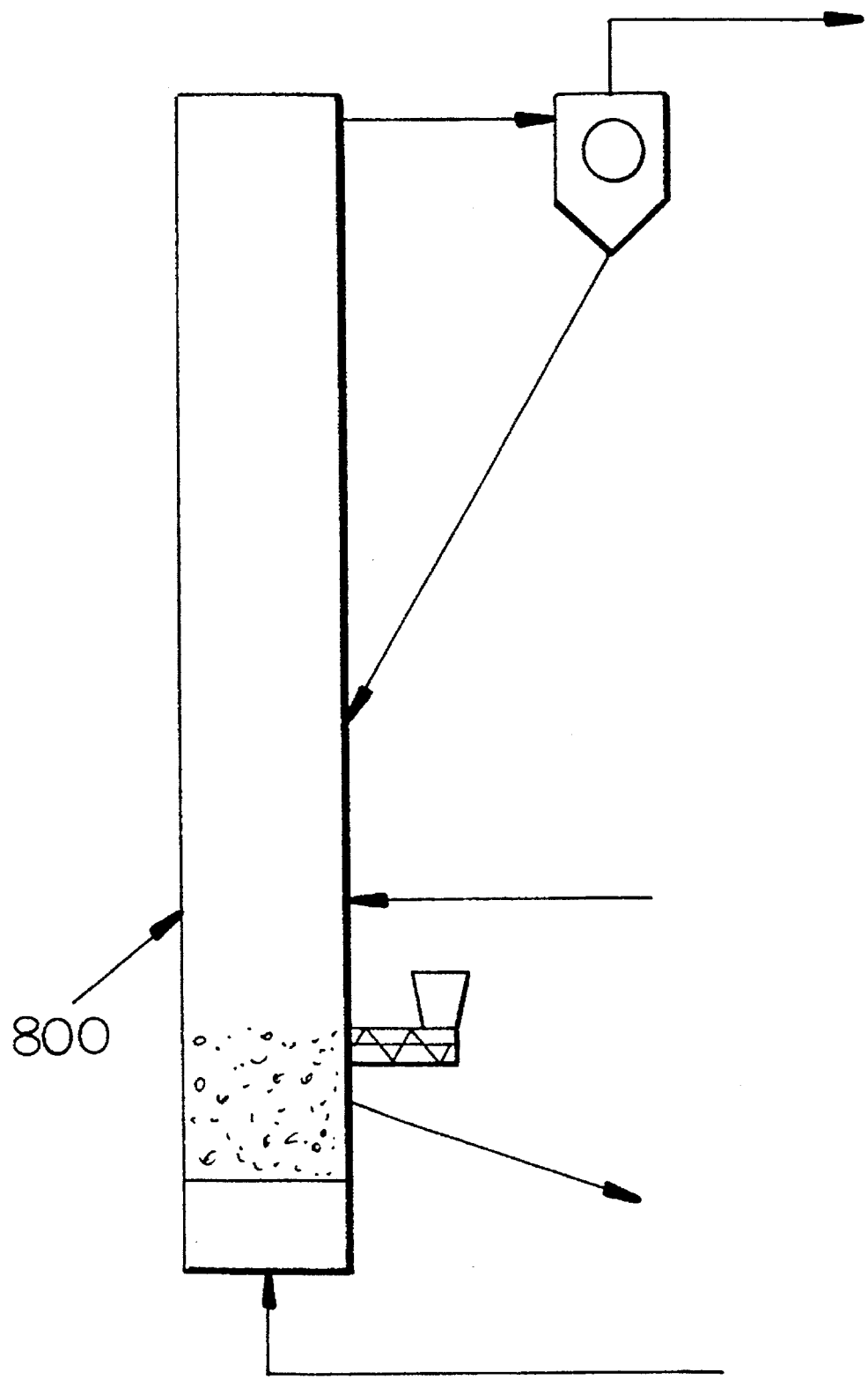

A system utilizing additional classifying steps is found in FIG. 5 between the contaminated material source 410 and the furnace 411. Here the material is fed to a preclassifier 70 followed by a coarse disintegration stage 71 which is followed in turn by an iron separator 72. The iron which is separated out can be recovered at 73. The product following the iron separation is further classified at 74 with recycling of the coarse fraction at 75 to the disintegrator 71.

Following the classifier 74 is a fine disintegrator 76, the product 77 of which is subjected to fine classification at 78 with its coarse fraction being recycled at 79 to the fine disintegrator 76. Fines from classifier 74 may be combined with the fines from classifier 78 at 80 to be fed to the furnace 411.

In accordance with FIG. 3 the contaminated material is fed directly or on a sorting belt to an attrition drum. Material having particle sizes below 10 mm is separated through a sieve and charged into a furnace. Material having particle sizes in excess of 30 mm is disintegrated in a crusher to particle sizes below 10 mm and is then recycled to the attrition drum. Material having particle sizes from 10 to 30 mm is divided in a jigging machine by a sink-float separation into light and heavy components. The lighter components (light material) are removed and the heavy components (heavy material) are recovered as purified material. If heavier components are not obtained as purified material or are only partly obtained as purified material, the heavy components may be recycled through a crusher to the attrition drum. The contaminated material and oxidizing agents added thereto will be heated in a rotary kiln if at least 80% of the material have a particle size below about 20 mm, and the contaminated material will be heated in a fluidized bed if at least 80% of the material have a particle size below about 3 mm.

In accordance with FIG. 4 the material discharged from the attrition drum is placed on a sieve to separate material having particle sizes below 1 mm and the material is then charged into a furnace. Material having particle sizes about 20 mm is disintegrated in a crusher to particle sizes below 1 mm and is then recycled to the attrition drum. Material having particle sizes from 1 to 20 mm is separated in a jigging machine into light and heavy components. The light components consist mainly of substances which are alien to the soil (wood, coal, root material) and are removed and the heavy components are recovered as purified material. The contaminated material together with added oxidizing agents will be heated in a furnace which consists of a floating-zone reactor if at least 80% of the material have particle sizes below about 1 mm.

In accordance with FIG. 5 the contaminated material having particle sizes below 500 mm is separated by a preclassification and the separated material is subjected to a coarse disintegration. Iron is separated from the material. Material having particle sizes below 6 mm, material having particle sizes from 50 to 500 mm, and material having particle sizes from 6 to 50 mm are separated in a first separating stage. The material having particle sizes below 6 mm, is charged into the furnace. The material having particle sizes from 50 to 500 mm is recycled to the coarse disintegrating stage. The material having particle sizes from 6 to 50 mm is subjected to a fine disintegration. Material having particle sizes below 6 mm, is separated in a second separating stage and is then charged into the furnace. Material having particle sizes form 6 to 50 mm is separated and recycled to the fine disintegrating stage.

The contaminated material is disintegrated to the size which is required for the furnace which is used in a given case. The contaminated material must always be disintegrated before a processing in a fluidized bed furnace or a floating zone reactor.

EXAMPLE

Contaminated material which contained 20% by weight $H_2O$ and 7200 mg/kg polycyclic aromatic hydrocarbons (PAHC), was subjected to a wet mechanical pretreatment. For that purpose the contaminated material and water in a ratio of 1:1 were charged to a drum and subjected to attrition therein.

The material discharged from the drum was classified into the following fractions:

I particle sizes >20 mm

II particle sizes 1 to 20 mm

III particle sizes <1 mm

Fraction I (>20 mm) was disintegrated and recharged to the attrition drum. Fraction II (1 to 20 mm) was subjected to a gravimetric sorting, by which the light material was separated, which consisted substantially of substances which are alien to the soil (wood, coal, root material) and amounted to about 1 to 5% by weight of the soil material. The PAHC content of the heavy material obtained was below the sanitation target level of 20 mg/kg. Because the PAHC content did not exceed that level, it was not necessary to redisintegrate and re-attrite the material. Fraction III (<1 mm) was dewatered to contain 30% by weight $H_2O$. The PAHC content amounted to 1170 mg/kg. That contaminated material was predried to decrease the $H_2O$ content to a value from 15 to 17% by weight. At a rate of 100 kg/h the contaminated material was then charged into a reactor which consisted of a rectangular chamber, which had a length of 4 meters, a width of 0.2 meter and a clear height of 0.3 meter. On a level which was 0.1 meter above the bottom of the chamber a sieve was mounted to extend throughout the cross section. The material was dropped from a feeder onto the sieve plate and was moved by a scraper chain conveyor over the sieve plate. Hot steam was supplied below the sieve plate. The hot steam acted as a fluidizing fluid. The hot steam was charged into the reactor at a rate of about 1 kg per 1 kg of contaminated material. The oxidizing agent $H_2O_2$ was added to the hot steam directly under the grate of the reactor at a rate of 2.5 liters $H_2O_2$ (100%) per 100 kg hot steam. The mixture of hot steam and $H_2O_2$ flowed through the fluidized bed of material from bottom to top. The temperature of the hot steam was so adjusted that the temperature in the reactor did not rise about 400° C. After a treating time of 15 minutes the PAHC content in the discharged material and in the eluate was determined in accordance with DEV S 4. The PAHC content was below the sanitation target level of 20 mg/kg and was near the detection threshold. The total cyanide content of the treated material and of the eluate was below the detection threshold.

Gas which contained hot steam and pollutants and was at a temperature of 400° C. was discharged from the reactor at a rate of 500 sm$^3$/h (sm$^3$=standard cubic meter or m$^3$STP) and was then dedusted in a tube filter. The dust contents were measured to amount to 200 mg/sm$^3$ on the raw gas side and to 1 mg/sm$^3$ on the pure gas side. The PAHC content of the dust was below the sanitation target level of 20 mg/kg. The dedusted gas was subsequently subjected to a catalytic oxidation, by which the remaining organic pollutants were destroyed. The content of organic substances in the gas was measured to amount to about 40 mg/sm$^3$ when the gas was admitted to the catalyst and to about 10 mg/sm$^3$ when the gas had left the catalyst. A part of the gas which had been catalytically aftertreated was recycled to the superheater of the steam generator and was subsequently recycled to the reactor. The remaining gas stream was passed through a condensing stage and was cooled to 40° C., whereby hot steam and the pollutants contained in the gas were condensed. The gas leaving the condensing stage was passed through a container which contained activated carbon for an adsorptive separation of the traces of pollutants which were still present. The gas which left the activated carbon filter complied with the requirements of the TA-Luft (German technical regulation for air pollution control). The condensate was treated in an emulsion cracking plant to remove the condensed PAHC and other organic pollutants and was subsequently purified in an activated carbon bed to a quality which was suitable for the discharge into a receiving body of water.

We claim:

1. A process for thermally separating at least one organic or inorganic pollutant from a contaminated material containing water and a soil, sand, sludge, solid aggregate, or solid residue, said process comprising the steps of:

(a) applying a contaminated material containing water and a soil, sand, sludge, solid aggregate, or solid residue said contaminated material containing at least one organic or inorganic pollutant therein, to a fixed sieve plate extending throughout a cross section of an elongate rectangular chamber above its bottom, said elongate rectangular chamber located within a directly heated or indirectly heated rotary kiln or a fluidized bed furnace;

(b) agitating said contaminated material at least in part by entraining said contaminated material upwardly with an entraining gas which is a recycled gas or the recycled gas and steam and at least one oxidizing agent, said entraining gas supplied from below the fixed sieve plate, to produce an effluent processing gas containing water vapor, dust and said pollutants and a decontaminated solid residue;

(c) dedusting the effluent processing gas and recycling to step (b) 80 to 90% by volume of the dedusted water-vapor-containing processing gas to said rotary kiln or fluidized bed furnace to provide the recycled gas as an entraining gas therein; and (d) condensing a liquid phase containing water from the balance of the processing gas from step (c), separating the liquid phase from a gas phase from which the liquid phase is condensed, and subjecting the separated liquid phase to a depollution processing.

2. The process defined in claim 1 wherein additional pollutants are removed by adsorption from the gas phase following step (d).

3. The process defined in claim 1 wherein said oxidizing agent is selected from the group which consists of oxygen-enriched air, $O_2$, $H_2O_2$, ozone, and mixtures thereof.

4. The process defined in claim 1 wherein the water-vapor containing exiting processing gas following dedusting is catalytically oxidized in a catalytic oxidizing stage and a partial stream of the gases leaving step (d) is recycled to the catalytic oxidizing stage.

5. The process defined in claim 4 wherein the catalytic oxidation is effected by at least one catalytically active substance selected from the group which consists of oxides and sulfates of a transition metal selected from the group which consists of vanadium, chromium, manganese, iron, cobalt, nickel, zinc, molybdenum and tungsten.

6. The process defined in claim 1 wherein the water-vapor containing exiting processing gas which has been dedusted is irradiated with UV light.

7. The process defined in claim 1 wherein the oxidizing agent is charged directly into the rotary kiln fluidized bed furnace.

8. The process defined in claim 1 wherein the contaminated material is dried before it is charged into the rotary kiln fluidized bed furnace.

9. The process defined in claim 1 wherein the contaminated material is disintegrated before it is charged into the rotary kiln fluidized bed furnace.

10. The process defined in claim 1 wherein the contaminated material is classified before it is charged into the rotary kiln fluidized bed furnace.

11. The process defined in claim 1 wherein the contaminated material is subjected to a pre-separation and a gravimetric separation before it is charged into the rotary kiln fluidized bed furnace.

12. The process defined in claim 1 wherein said contaminated material is moved in said rotary kiln by rotating the rotary kiln forming the furnace.

13. The process defined in claim 1 wherein said contaminated material is moved in said fluidized bed furnace by fluidizing said contaminated material.

14. The process defined in claim 1 wherein said depollution processing in step (d) is a wet chemical processing.

15. The process defined in claim 1 wherein said depollution processing in step (d) is a physical processing.

* * * * *